Jan. 21, 1941. C. E. FISETTE 2,229,499
MAGNETIC CONTROL VALVE FOR FLUID ACTUATED TRAILER BRAKES
Original Filed March 29, 1937
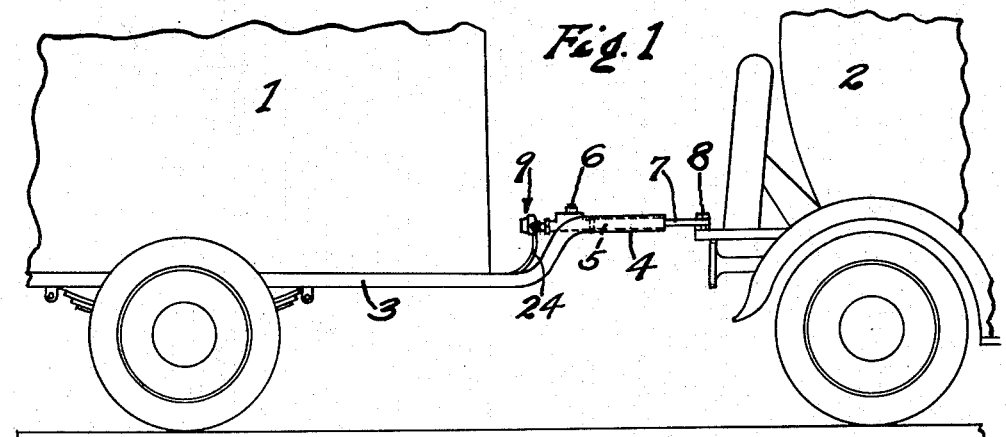
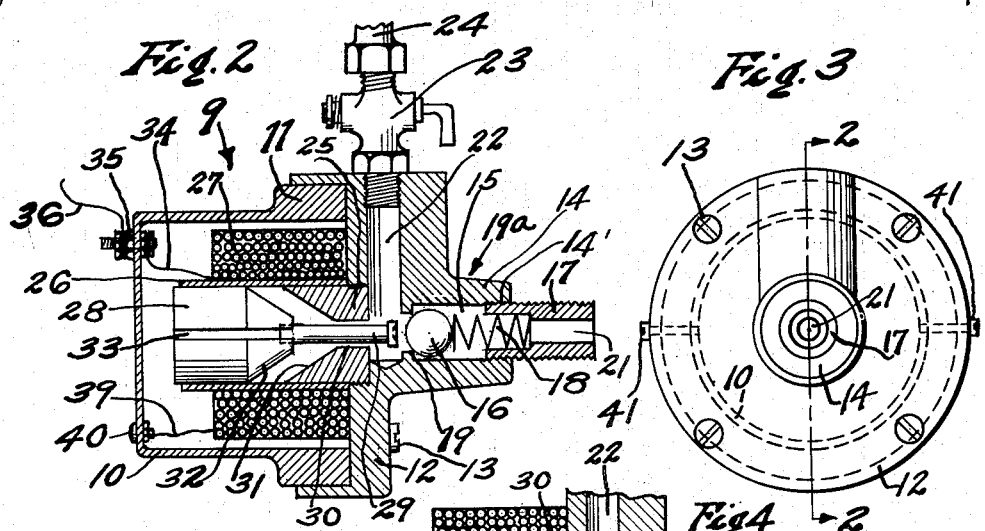
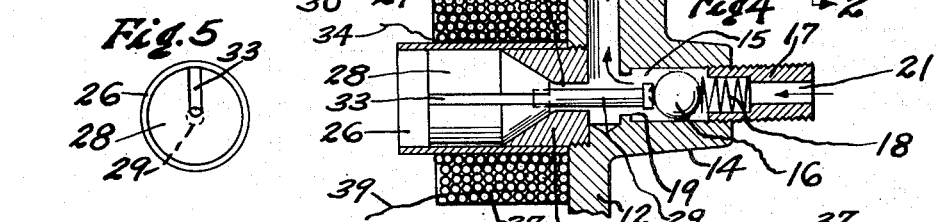
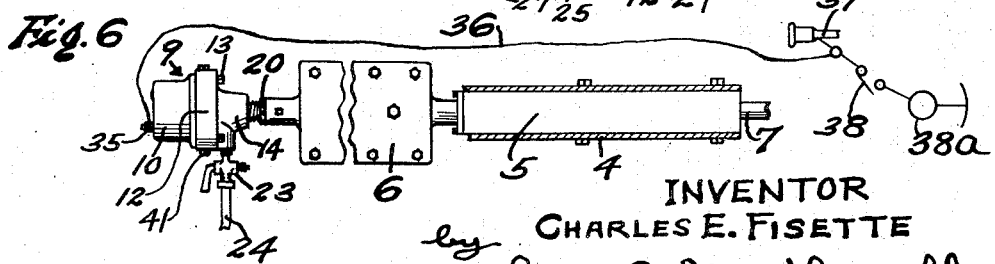
INVENTOR
CHARLES E. FISETTE
by John A. McDowell
his atty.

Patented Jan. 21, 1941

2,229,499

UNITED STATES PATENT OFFICE 2,229,499

MAGNETIC CONTROL VALVE FOR FLUID ACTUATED TRAILER BRAKES

Charles E. Fisette, Los Angeles, Calif.

Application March 29, 1937, Serial No. 133,635
Renewed June 14, 1940

2 Claims. (Cl. 188—112)

This invention relates to an application filed by me Oct. 28, 1936, Serial No. 108,031, which has matured into Patent No. 2,107,565, on Feb. 8, 1938.

An object of this invention is to provide a fluid control valve placed between the rear end of an automobile and a trailer to synchronize the trailer brakes with the brakes of the automobile.

Another object of this invention is to provide a device that will nullify the operation of the trailer brakes when the automobile is in reversing motion, and to prevent the operation of the trailer brakes when the trailer is in an over-running motion, unless the control valve is energized by the stop light electric circuit causing said control valve to open.

Another object of this invention is to provide a magnetic fluid control valve that may be adapted to control the fluid output of any hydraulic brake master cylinder.

This invention may have a variety of applications and certain of the features of construction may be embodied in a variety of structures.

Other objects, advantages and features of invention may appear from the accompanying drawings, the subjoined detailed description and the appended claims.

The accompanying drawing illustrates the invention.

Figure 1 is a fragmental side elevation of a trailer and automobile showing how the invention is applied to the trailer frame tongue and shows diagrammatically the method of connecting the invention to the master brake cylinder and to the fluid line which is also shown.

Fig. 2 is an enlarged section of the invention taken on line 2—2 Figure 3 showing the ball check valve in closed position and the plunger in retarded position. The emergency valve is also shown with a fragment of the fluid feed line connected thereto.

Fig. 3 is a side elevation of Fig. 2.

Fig. 4 is a fragmental view analogous to Fig. 2 showing the plunger in action releasing the ball check valve and holding it in open position to permit the fluid to flow in the direction as shown by the arrows.

Fig. 5 is an end view of the plunger and plunger sleeve showing the vent slot in the plunger.

Fig. 6 is a fragmental exaggerated diagrammatic view showing how the invention is applied to the master brake cylinder and the relation with the master plunger body, a fragment of which is shown. Also shows how the invention may be wired to the stop light circuit of an automobile.

The reference numeral 1 designates the front end of a trailer and 2 the rear end of an automobile and only such portion thereof illustrated as required to locate the device of my invention. The frame 3 and trailer tongue 4 of the trailer 1 are, or may be of any approved construction.

A master plunger body 5 is shown connected to a master cylinder 6 and a master plunger 7 is connected at 8 to the automobile 2 as shown in Fig. 1 of the drawing.

The magnetic control valve 9 comprises a housing 10 having at one end an enlarged flange 11 that permits the lid 12 to fit snugly on and which is held in place by the bolts 13 to prevent any leakage of the fluid not shown from the housing 10.

The lid 12 is provided with an extended boss 14 that is adapted to form a channel 15 that permits the ball 16 to operate therein. At the forward end of the channel is a female thread 14' in which a retention collar 17 is threaded therein and that houses a retention spring 18 that contacts the ball 16 and holds it against a seat 19 to create a ball check valve as at 19a.

The retention collar 17 also acts as a connection as at 20 to the master cylinder 6 and the orifice 21 in the retention collar 17 permits the flow of fluid from the master cylinder into the magnetic control valve 9.

Extending at right angles to the channel 15 is an outlet 22 provided at its outer end with an emergency valve 23 that is open at all times but may be closed when necessary and connects up with the fluid line 24 that runs to the brakes of the trailer not shown.

A plunger butt 25 is threaded into the lid 12 and extends outwardly to permit a plunger sleeve 26 to be mounted thereon, upon which a winding 27 is mounted.

A plunger 28 is slidably mounted in the plunger sleeve 26 and is provided with a plunger extension 29 that is made of bronze or brass which may contact the steel ball 16.

The plunger butt 25 is provided with a hole 30 through which the plunger extension 29 passes and has a cup shaped end 31 that permits the cone shaped end 32 of the plunger 28 to abut against.

A vent slot 33 is constructed in the plunger 28 to permit fluid to flow through to release vacuum inside plunger sleeve 26 that might otherwise prevent the operation of the plunger.

To supply electricity to the winding 27 a wire 34 connects to the connection 35 where the wire 36 connects up to the stop light circuit 37 which is then connected to the stop light switch 38 and then controlled manually by the brake pedal 38a of the automobile.

A ground wire 39 is shown running from the winding 27 and is grounded at 40 to the housing 10 as shown in Figs. 2 and 4 of the drawing.

41 indicates plugs that permit the release of air from the housing when necessary.

The magnetic control sleeve 26 is filled with fluid at all times, therefore the vent slot 33 in the plunger 28 allows the fluid to by-pass at the time of plunger operation.

The operation of depressing foot brake pedal 38a of the automobile causes the magnetic valve 9 to be energized, opening the valve allowing the over-run of the trailer to operate the master control by creating action against the master cylinder plunger (not shown) to cause the fluid to pass the ball check valve 19a and distribute through the feed lines to the wheel cylinders causing the brakes of the trailer to be applied as is required.

Also when pressure is released by the forward movement of the towing car the master control is moved to a forward position causing release of the master cylinder 6 allowing the fluid to return from the wheel cylinders of the trailer brakes (not shown) through the feed lines by passing through the magnetic control valve 9 to the master cylinder releasing the trailer brakes.

This fluid return is aided by the contracting springs across the brake shoes in the present hydraulic brakes.

I claim:

1. In combination with a trailer provided with brakes and an automobile for pulling the trailer, a master cylinder for actuating the trailer brakes, a magnetically operated valve mechanism comprising a ball check means disposed at one end of said master cylinder and connected to the brake fluid line of said trailer, said operated valve comprising a housing having an enlarged flange at one end, a lid mounted on and fixed to said flange, said lid provided with an extended boss that is adapted to house a ball check valve, an outlet extending at right angles from said ball check valve to an emergency valve that is connected to the brake fluid line, means connecting said check valve mechanism to said master cylinder, a plunger butt mounted in said lid and extending into said housing that permits a plunger sleeve mounted on said butt to support a winding, an armature disposed within said plunger sleeve having a plunger extension at its forward end operable to unseat said ball check valve, and manual brake control means on the automobile adapted, when actuated, to energize said winding to cause said plunger extension to unseat said ball check valve, to thereby permit the fluid to flow from the master cylinder to apply the trailer brakes, and to be allowed to seat when released by said manual control means to permit only a return flow to the master cylinder to thereby release the trailer brakes.

2. In combination with a trailer provided with brakes and an automobile for pulling the trailer, a master cylinder for actuating the trailer brakes, a magnetically operated valve mechanism comprising a ball check means disposed at one end of said master cylinder and connected to the brake fluid line of said trailer, said valve mechanism having manual control means on the automobile to pass fluid through said ball check means from the master cylinder to the trailer brakes allowing them to operate, said ball check means being allowed to seat when released by said manual control means to permit only a return flow of fluid to the master cylinder to thereby release the trailer brakes.

CHARLES E. FISETTE.